United States Patent

[11] 3,596,412

| [72] | Inventor | Jay H. Brayman |
| | | P.O. Box 2, Dorsey, Ill. 62021 |
| [21] | Appl. No. | 860,979 |
| [22] | Filed | Sept. 25, 1969 |
| [45] | Patented | Aug. 3, 1971 |

[54] ROTARY MOWER BLADE SHARPENING APPARATUS
9 Claims, 8 Drawing Figs.

[52] U.S. Cl. ........................................... 51/246, 76/82.1
[51] Int. Cl. ........................................... B24b 19/00
[50] Field of Search ................................ 51/246; 76/82.1

[56] References Cited
UNITED STATES PATENTS

| 3,136,107 | 6/1964 | Spear | 76/82.1 |
| 3,225,527 | 12/1965 | Spear | 76/82.1 |

*Primary Examiner*—William R. Armstrong
*Attorney*—Koenig, Senniger, Powers and Leavitt ABSTRACT: Apparatus for sharpening the blade of a rotary lawn mower without removing it from the mower, utilizing the mower engine for rotating the blade for sharpening it, having a base and a sharpener mounted for up-and-down movement with respect to the base, the sharpener being moved up into position for sharpening the blade from below on rolling the mower over the sharpener, and a special blade adapted for being sharpened by the apparatus.

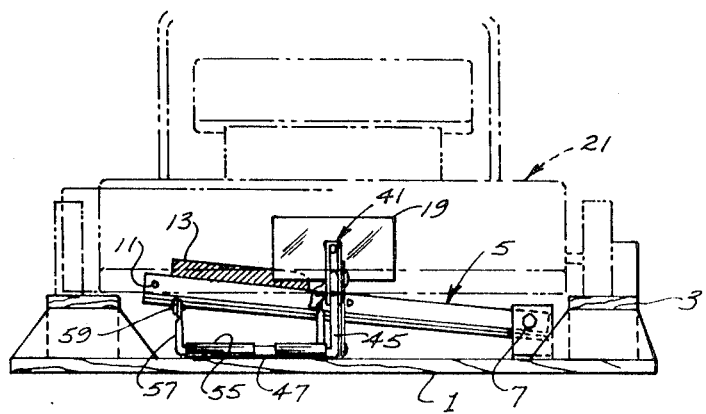
FIG. 3
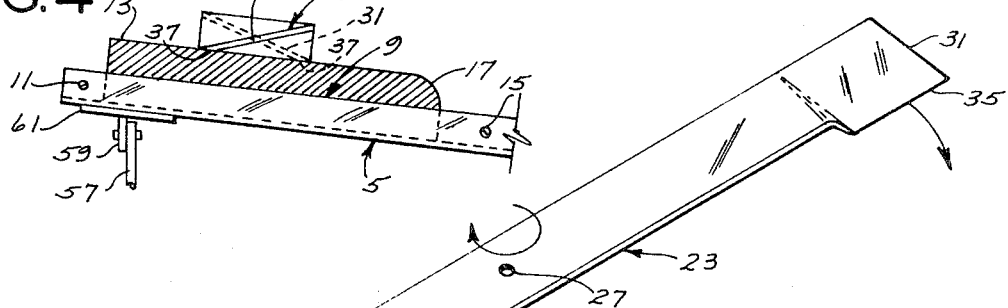
FIG. 4
FIG. 5
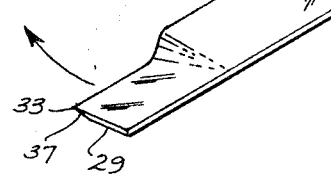
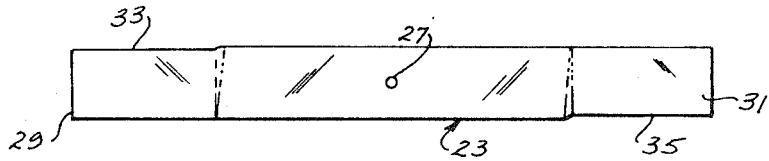
FIG. 6
FIG. 7
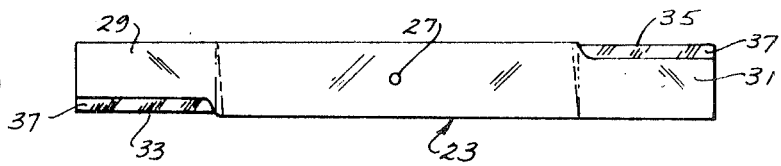
FIG. 8

ROTARY MOWER BLADE SHARPENING APPARATUS

BACKGROUND OF THE INVENTION

This invention relates to apparatus for sharpening a rotary mower blade, more particularly for sharpening the blade in situ, and a special blade adapted to be sharpened thereby.

It has heretofore been proposed to provide for sharpening a rotary mower blade without removing it from the mower by incorporating a sharpener in the mower housing; see, for example, U.S. Pat. Nos. 3,136,107, 3,225,527 and 3,315,452. The arrangements shown therein have disadvantages including that of requiring increase in the size of the mower housing to incorporate the sharpener, and that of difficulty in inspecting the work.

SUMMARY OF THE INVENTION

Among the several objects of this invention may be noted the provision of improved apparatus for sharpening a rotary mower blade without removing the blade from the mower; the provision of such apparatus adapted to sharpen the blade from below so that the work may be readily inspected; and the provision of a blade for a rotary mower particularly adapted for such sharpening.

In general, apparatus constructed in accordance with this invention comprises a sharpener (e.g., a stone) mounted on a base for up-and-down movement, adapted for rolling the mower over the sharpener, a pusher positioned for engagement by the mower housing, and means connecting the pusher and the sharpener with the arrangement such that when the pusher is engaged by the mower housing as the mower is rolled over the sharpener, the sharpener is moved up into position to sharpen the mower blade as it rotates over the sharpener. The blade of the invention comprises a flat bar adapted to be centrally attached to the vertical shaft of the mower in horizontal position, and having end portions bent downward from the plane of the bar in opposite directions to provide downwardly offset leading edges in respect to the direction of rotation of the blade, each of said offset leading edges being bevelled on its underside to provide a sharp cutting edge which is sharpenable from below. Other objects and features will be in part apparent and in part pointed out hereinafter.

BRIEF DESCRIPTION OF THE DRAWINGS

FIG. 3 is an end elevation on line 3—3 of FIG. 1; with parts removed for purposes of clarity;

FIG. 4 is an enlarged fragment of FIG. 3 showing a blade being sharpened;

FIG. 5 is a perspective of a rotary blade of this invention per se;

FIG. 6 is a top plan of the blade of FIG. 5;

FIG. 7 is a front elevation of the blade of FIG. 5; and

FIG. 8 is a bottom plan of the blade of FIG. 5.

Corresponding reference characters indicate corresponding parts throughout the several views of the drawings.

Referring to FIGS. 1—3 of the drawings, apparatus constructed in accordance with this invention for sharpening the blade of a rotary mower is shown to comprise a flat rectangular base 1 adapted to rest on the ground (or on a floor). A pair of ramps 3 extend lengthwise of the base at opposite sides thereof. An arm generally designated 5 is pivotally mounted on the base as indicated at 7 for swinging movement on an axis generally parallel to the inclined plane of the ramps adjacent one of the ramps, this arm extending laterally of the base toward the other ramp, and being located adjacent one end of the base constituting its forward end (its right-hand end as shown in FIGS. 1 and 2). Arm 5, as illustrated, comprises a pair of angles, each designated 9 arranged to have bottom legs 9a extending toward one another and upwardly extending side legs 9b. A bolt 11 extends through the side legs adjacent the free end of the arm. Mounted on the arm is an elongate grinding stone 13 generally of rectangular cross section. This stone seats on the bottom legs 9a of the angles 9 and is confined by the side legs 9b of the angles. The side legs of the angles are adapted to be drawn together to clamp the stone in adjusted position lengthwise of the arm by means of bolt 11 and another clamp bolt 15. The arm is swingable up and down on its pivot axis at 7 to move the stone up and down, the upper surface of the stone being inclined upward in the direction crosswise of the base from the pivot 7 toward the free end of the arm and also inclined upward in the direction lengthwise of the base from the rear toward the forward end of the base. At its end toward the pivot 7, the stone is rounded off at the top to provide a rounded trailing end surface 17 (see FIG. 4).

At 19 is indicated a pusher adapted for engagement by the forward end of the housing of a rotary mower designated in its entirety by the reference numeral 21 when the mower is rolled up on the ramp 3 from the rearward end (the left end as shown in FIGS. 1 and 2) of the base 1. The mower has a special blade 23 of this invention adapted for being sharpened from below by the stone 13 on rotation of the blade by the mower motor 25. The direction of rotation of the mower blade is clockwise as viewed from above (and as viewed in FIG. 1). Referring to FIGS. 4—8, the blade is shown as comprising a flat bar having a central opening 27 for mounting it on the downwardly extending drive shaft of the mower, and end portions 29 and 31 bent downwardly from the plane of the bar in opposite directions to provide downwardly offset end-cutting portions having leading cutting edges 33 and 35 on opposite sides of the bar (leading in the sense of the direction of rotation of the blade). Each of these bent-down end portions of the bar is bevelled as indicated at 37 on its underside along its leading edge so as to provide a sharp leading cutting edge which is sharpenable from below. It has been found that best results are obtained when these cutting edges are offset downwardly from the plane of the bar from which the blade is made from about five thirty-seconds of an inch to about three-eighths of an inch.

Figure 1:
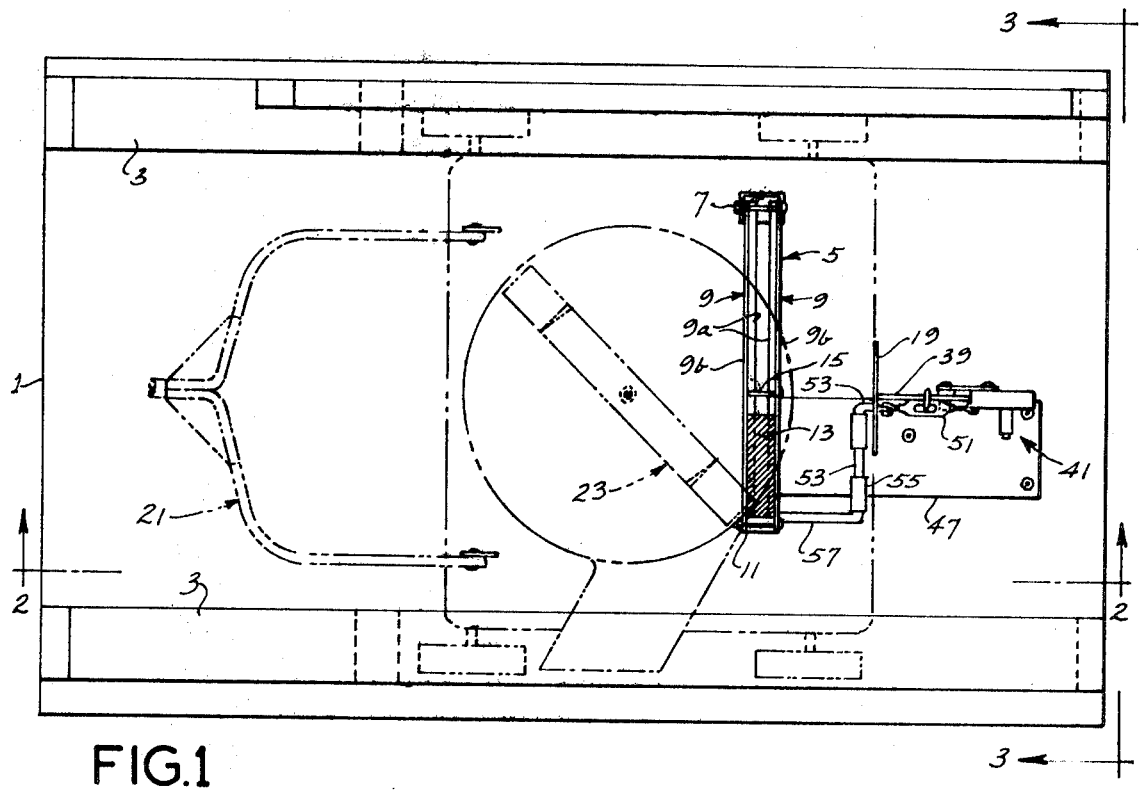
FIG. 1 is a plan of apparatus constructed in accordance with the invention, showing a mower thereon in phantom.

The pusher 19 is constituted by a plate on the rearward end of a rod 39 extending rearward from the upper link of a parallelogram linkage generally designated 41 mounted on the base 1 between the arm 5 and the forward end of the base. This linkage comprises a pair of parallel links 43 and 45 extending upward from the base 1 pivoted at their lower ends on a mounting 47 on the base and a generally horizontal upper link 49 interconnecting the upper ends of the links 43 and 45. Rod 39 is adjustably secured to link 49 by a setscrew 50, the adjustment accommodating a variety of mower housing designs. A turnbuckle 51 connects link 49 and one arm 53 of a bellcrank pivoted at 55 on the base 1. The other arm 57 of the bellcrank carries a roller 59 at its free end. Arm 5 has a plate 61 at its free end bearing on the roller 59.

Figure 2:
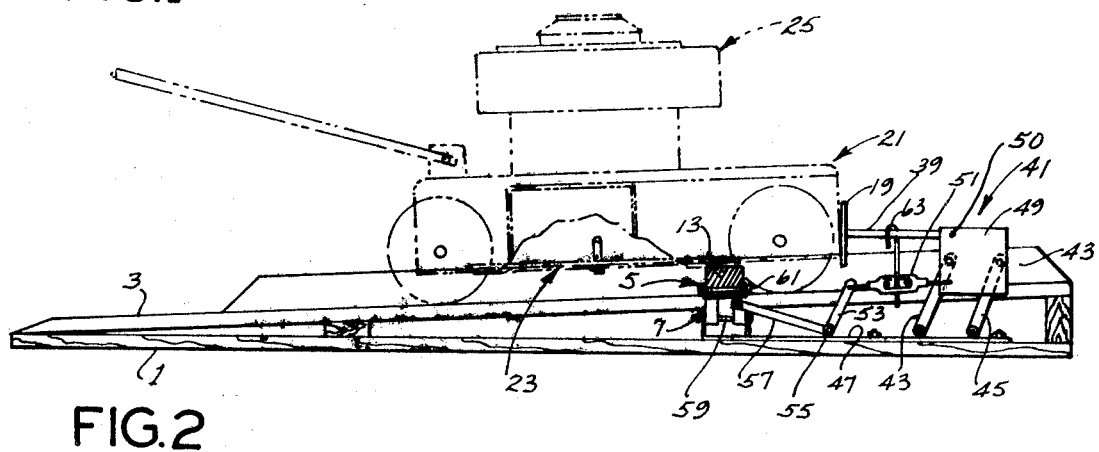
FIG. 2 is a longitudinal section on line 2—2 of FIG. 1.

The pusher 19, the parallelogram linkage 41, the turnbuckle 51 and the bellcrank 53, 57 constitute a lifting mechanism for the sharpener arm 5, the arrangement being such that when mower 21 is rolled up on the ramps 3 to a working position over the stone 13, the forward end of the mower housing engages the pusher 19 and moves it and the upper horizontal link 49 forward a limited distance. Link 49 pulls the turnbuckle 51 forward to swing bellcrank 53, 57 in the direction to swing the sharpener arm 5 upward, thus raising the stone 13 from its retracted position to a raised position for wiping contact of the lower edge portions 37 of the blade 23 with the top of the stone as the blade is rotated by the motor of the mower. It will be observed that the stone has its upper surface inclined upward along the circular path of the lower edge portions 37 of the blade 23 in the direction of rotation of the blade, and that the length of the stone is generally tangent to this circular path. The turnbuckle 51 is initially adjusted for proper positioning of the stone in respect to the blade when pusher 19 is pushed forward by the mower housing. A hook 63 is shown in FIG. 2 as hung on rod 39 and extending down through the turnbuckle to keep the turnbuckle from turning and getting out of adjustment due to vibration that may occur when sharpening a blade.

While the blade 23 of this invention is especially adapted for being sharpened by the apparatus of this invention, it also operates very efficiently on a mower and may be sharpened by any other suitable sharpening device. The results obtained from blade 23 are better than the results obtained from the types of blades currently in use due to the fact that with blade 23 there is much less friction or drag on the tips of the grass that has been cut. As to the blades currently in use, there is a considerable blade area that drags on top of the cut grass, noting that the full width of most of these blades drags on the grass after it has been cut. As to the blade 23, only the downwardly offset bevelled edges 37 drag on the cut grass.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What I claim is:

1. Apparatus for sharpening a blade of a rotary mower without removing the blade from the mower comprising a sharpener, means mounting the sharpener for movement upward from a lowered retracted position and back down to retracted position, said apparatus being adapted to have a mower moved over the sharpener to a working position for wiping contact of the lower edges of end portions of the blade with the sharpener as the blade is rotated by the motor of the mower, and means engageable by the mower as it is moved to said position for moving the sharpener upward from its retracted position to a raised position for said wiping contact of said lower edges of said end portions of the blade with the sharpener as the blade is rotated.

2. Apparatus as set forth in claim 1 wherein said sharpener moving means comprising a lifting mechanism for the sharpener having a pusher engageable by the front end of the mower housing as the mower is moved to its said working position for raising the sharpener.

3. Apparatus as set forth in claim 2 wherein the sharpener comprises a stone having a generally flat upper surface wiped by said lower edge portions of the blade, said mounting means holding the stone with its said upper surface inclined upward along the circular path of said lower edge portions of the blade in the direction of rotation of the blade.

4. Apparatus as set forth in claim 3 wherein the stone is an elongate stone of generally rectangular cross section disposed with its length generally tangent to said circular path.

5. Apparatus as set forth in claim 4 wherein the stone, at its trailing end in respect to the direction of rotation of the blade, has its top rounded off.

6. Apparatus for sharpening a blade of a rotary motor without removing the blade from the mower comprising a flat base, a pair of ramps extending lengthwise of the base at opposite sides thereof, a sharpener, means mounting the sharpener on the base between the ramps for movement upward from a lowered retracted position and back down to retracted position, said apparatus being adapted to have a mower rolled up on the ramps to a working position wherein the lower edges of end portions of the blade are adapted for wiping contact with the sharpener as the blade is rotated by the motor of the mower, and means mounted on the base between the ramps forward of the sharpener engageable by the front end of the mower housing as the mower is rolled up on the ramps to its said working position for moving the sharpener upward from its retracted position to a raised position for said wiping contact of said lower edges of said end portions of the blade with the sharpener as the blade is rotated.

7. Apparatus as set forth in claim 6 wherein said mounting means comprises an arm pivoted for swinging movement on an axis generally parallel to the inclined plane of the ramps adjacent one of the ramps and extending toward the other ramp, said sharpener comprising a stone mounted on said arm.

8. Apparatus as set forth in claim 7 wherein said sharpener moving means comprises a lifting mechanism for said arm having a pusher engageable by the front end of the mower housing as the mower is rolled up on the ramps to its said working position.

9. Apparatus as set forth in claim 8 wherein said lifting mechanism includes a parallelogram linkage including a pair of links extending upward from the base and pivoted at their lower ends on the base and an upper link interconnecting the upper ends of the upwardly extending links, said pusher being carried by said upper link, and a rocker lever pivoted on the base engageable with said arm and interconnected with said linkage.